B. D. EMANUEL.
COMPUTING SCALE.
APPLICATION FILED MAY 27, 1912.

1,109,054.

Patented Sept. 1, 1914.

WITNESSES:
A. H. Edgerton.
O. M. McLaughlin

INVENTOR.
Benjamin D. Emanuel.
BY
V. H. Lockwood
ATTORNEY.

UNITED STATES PATENT OFFICE.

BENJAMIN D. EMANUEL, OF HAMILTON, OHIO, ASSIGNOR, BY MESNE ASSIGNMENTS, TO THE HAMILTON SCALE & TANK COMPANY, OF HAMILTON, OHIO, A CORPORATION.

COMPUTING-SCALE.

1,109,054.  Specification of Letters Patent.  Patented Sept. 1, 1914.

Application filed May 27, 1912. Serial No. 700,023.

*To all whom it may concern:*

Be it known that I, BENJAMIN D. EMANUEL, a citizen of the United States, and a resident of Hamilton, county of Butler, and State of Ohio, have invented a certain useful Computing-Scale; and I do hereby declare that the following is a full, clear, and exact description thereof, reference being had to the accompanying drawings.

The object of this invention is to provide an improved weighing scale of the pendulum type wherein the weight and wear on the pivots and the strain on the parts will be minimized. To that end the scale is arranged so that the pendulum will be suspended vertically at zero and thus exert no particular pull or stress on the parts as occurs in a scale arranged so that the weight is elevated at zero. The scale stands at zero almost all of the time excepting when it is being weighed upon. Also the fulcrum of the scale beam is located between the load receiving platform and indicating means so that the weight of the beam and the parts on the beam are as light as possible and thus the wear on the pivots is reduced to a minimum.

Figure 1:
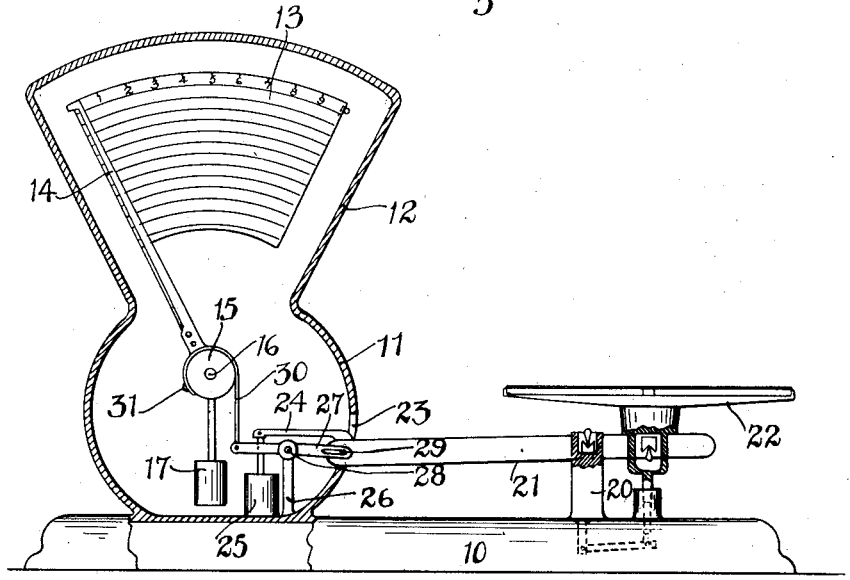
Figure 2:
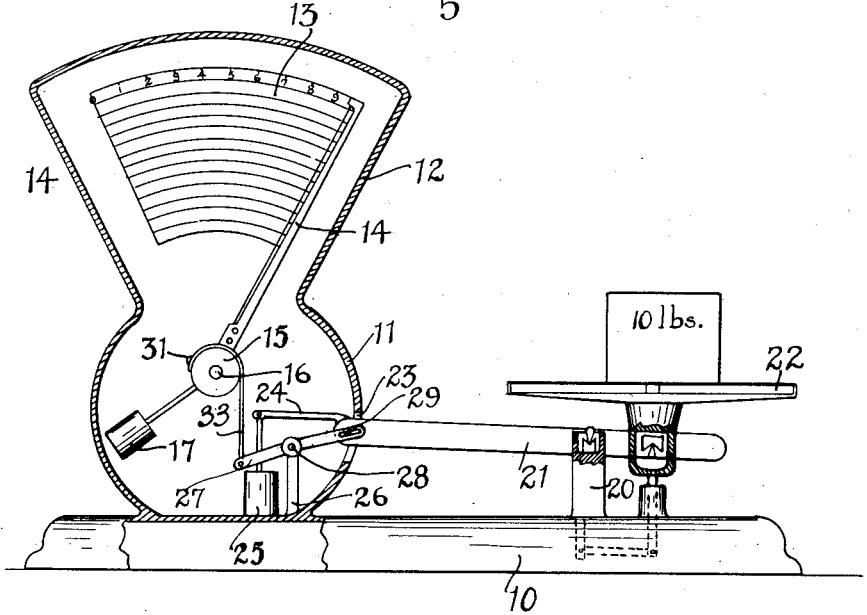

The nature of the invention will be understood from the accompanying drawings and the following description and claims:

In the drawings, Figure 1 is a side elevation of the scale with no load, with portions in vertical section, as indicated, and parts broken away. Fig. 2 is the same view of the scale as Fig. 1, but with a load.

In the drawings there is shown a base 10 with a housing thereon consisting of the lower substantially circular portion 11 and the upper fan-shaped portion 12. In the fan-shaped portion a chart 13 is secured containing graduations relative to weight or value, or both, as desired. An indicator or hand 14 is secured to a hub 15 mounted on a pinion or shaft 16 so that the indicator moves in an arc across the chart. A pendulum 17 is suspended from the hub 15 so as to be vertical when the indicator is at zero.

The platform has a stand 20 in which a scale beam 21 is fulcrumed. On the outer end of the scale beam a platform 22 is mounted in any usual way. The other end of the scale beam is weighted so as to overbalance the end carrying the platform and also the platform so that the end of the beam carrying the platform is normally elevated while the other end of the beam is normally weighted down. The weighted end of the beam projects through an opening 23 into the housing and has a small arm 24 extending from it which is connected with the dash pot 25.

Within the housing there is a post 26 on which a lever 27 is fulcrumed between its ends on the pin 28. This lever is pivotally connected with the scale beam by having a longitudinal slot through which a pin 29 from the scale beam projects. The other end of the lever is connected with a flexible strap 30 which extends up over the hub 15 and is fastened thereto by any suitable means 31.

In the idle position or unloaded position, the inner end of the scale beam is weighted down, and the pendulum is normally vertical with the indicator at zero. As load is applied, as seen in Fig. 2, the end of the scale beam is elevated and the lever 27 draws the strap 30 downward and causes the movement of the indicator. The pendulum does not cause the forward movement of the indicator, but does cause the rearward movement thereof or return to zero. The pendulum also tends to counterbalance the load and bring about an equilibrium between the parts.

I claim as my invention:

1. A weighing scale including a housing, load receiving means, a scale beam carrying said load receiving means on one end and fulcrumed between the load receiving means and the housing and with one end projecting into the housing and overbalancing the outer end of the beam and the load receiving means, an indicator having a hub pivoted in the housing, a pendulum secured on said hub and suspended vertically when the indicator is at zero, a lever fulcrumed between its ends with one end pivotally connected with the inner end of the scale beam, and a flexible strip connected with the other end of the lever passing over the hub of the indicator and secured to the opposite side thereof.

2. A weighing scale including a housing, load receiving means, a scale beam carrying said load receiving means on one end and fulcrumed between the load receiving means and the housing and with one end projecting into the housing and overbalancing the outer end of the beam and the load receiving means, an indicator having a hub pivoted in the housing, a pendulum secured on said hub and suspended vertically when the indicator is at zero, a lever fulcrumed between its ends with one end pivotally connected with the inner end of the scale beam, a flexible strip connected with the other end of the lever passing over the hub of the indicator and secured to the opposite side thereof, a dash pot in said housing, and an arm extending from the inner end of the beam to an operative connection with said dash pot.

In witness whereof, I have hereunto affixed my signature in the presence of the witnesses herein named.

BENJAMIN D. EMANUEL.

Witnesses:
J. E. PRICE,
W. J. SKEHAN.